(12) United States Patent
Kino (10) Patent No.: US 8,322,245 B2
(45) Date of Patent: Dec. 4, 2012

(54) SHIFT LEVER APPARATUS

(75) Inventor: Keisuke Kino, Hamamatsu (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 355 days.

(21) Appl. No.: 12/710,386

(22) Filed: Feb. 23, 2010

(65) Prior Publication Data
US 2010/0242656 A1 Sep. 30, 2010

(30) Foreign Application Priority Data

Mar. 31, 2009 (JP) .................. 2009-084533

(51) Int. Cl.
*B60K 17/04* (2006.01)
*B60K 17/12* (2006.01)
*B60K 20/00* (2006.01)
*F16H 59/04* (2006.01)

(52) U.S. Cl. .................. 74/473.12; 74/473.3

(58) Field of Classification Search .............. 74/473.1, 74/473.12, 473.21, 473.25, 473.3
See application file for complete search history.

(56) References Cited

U.S. PATENT DOCUMENTS

| | | | | |
|---|---|---|---|---|
| 4,519,266 A | * | 5/1985 | Reinecke | 74/471 XY |
| 4,912,997 A | * | 4/1990 | Malcolm et al. | 74/335 |
| 6,415,677 B1 | * | 7/2002 | Skogward | 74/473.12 |
| 2005/0028632 A1 | * | 2/2005 | Giefer et al. | 74/473.1 |
| 2008/0108480 A1 | | 5/2008 | Kamada et al. | |
| 2010/0294067 A1 | * | 11/2010 | Bak et al. | 74/473.12 |

FOREIGN PATENT DOCUMENTS

| | | |
|---|---|---|
| JP | 58-73445 A | 5/1983 |
| JP | 63-68016 U | 5/1988 |
| JP | 2008-115944 A | 5/2008 |
| JP | 2008-132932 A | 6/2008 |

* cited by examiner

*Primary Examiner* — Justin Krause
(74) *Attorney, Agent, or Firm* — Foley & Lardner LLP

(57) ABSTRACT

A shift lever apparatus includes: a housing; a shift lever including a shift lever base member extending in the Z-axis direction, and being arranged to pivot about the shift shaft in the X-axis direction, and a shift lever movable member arranged to move between a first axial side and a second axial side in an axial direction relative to the shift lever base member, the shift lever being arranged to move from a reference position on the first axial side, through an N-position on the second axial side, to one of a pair of positions; an urging member; and a detent pin, the housing including a guide groove arranged to guide the detent pin along the Z-axis direction so as to guide the shift lever movable member only from the N-position to the reference position when the shift lever movable member is positioned on the second axial side.

8 Claims, 12 Drawing Sheets

SHIFT LEVER APPARATUS

BACKGROUND OF THE INVENTION

This invention relates to a shift lever apparatus which is a shift-by-wire type to convert a shift position of a shift lever to an electric signal, to transmit the electric signal to a transmission to set a gear position based on the electric signal.

A patent document 1 (U.S. Patent Application Publication No. 2008/0108480 A1 corresponding to Japanese Patent Application Publication No. 2008-115944) and a patent document 2 (Japanese Patent Application Publication No. 2008-132932) disclose conventional shift lever apparatuses. In the shift lever apparatus of the patent document 1, when a shift lever 200 is moved from a reference position on a right side, through an N-position 206 on a left side, to a D-position 208 on a front side of a vehicle or an R-position 204 on a rear side of the vehicle, the shift lever 200 is returned through the N-position 206 to the reference position after the operation, as shown in FIG. 3 of the patent document 1. For attaining this movement of the shift lever 200, a shift rotational shaft 24 is rotatably provided to a base bracket 2, as shown in FIG. 1 of the patent document 2. A shift lever 3 is provided through a select rotational shaft 25 to the shift rotational shaft 24. Consequently, the structure of the shift lever apparatus is complicated. The size of the shift lever apparatus in the leftward and rightward direction increases.

On the other hand, in the shift lever apparatus of the patent document 1, the shift lever is not pivoted in the leftward and rightward directions of the vehicle, and the shift lever is pivoted only in the forward and rearward directions, as shown in FIG. 12. Therefore, an I-shaped passage 262 extends in the forward and rearward directions. A reference position is provided at a neutral position (central position) of the passage 262. An R-position is provided on the front side of the reference position. An N1-position is provided between the R-position and the reference position. A D-position is provided on the rear side of the reference position. An N2-position is provided between the D-position and the reference position.

SUMMARY OF THE INVENTION

However, the shift lever apparatus of FIG. 12 of the patent document 1 needs two N-positions. A length of the shift lever apparatus in the forward and rearward directions of the vehicle increases. Moreover, the number of the sensors for sensing the position increases. Furthermore, when the force in the forward and rearward directions of the vehicle body is accidentally acted to the shift lever 200, the shift lever 200 may be moved through the N1-position to the R-position, and may be moved through the N2-position to the D-position.

It is, therefore, an object of the present invention to provide a shift lever apparatus devised to solve the above-mentioned problems.

According to one aspect of the present invention, a shift lever apparatus comprises: a housing disposed within a vehicle body in a three dimensional space constituted by an X-axis, a Y-axis and a Z-axis, the Y-axis being leftward and rightward directions of the vehicle body; a shift lever including; a shift lever base member extending in the Z-axis direction within the housing, and including a shift shaft extending substantially parallel to the Y-axis, the shift lever base member being arranged to pivot about the shift shaft in the X-axis direction, and a shift lever movable member provided with a knob, and arranged to move between a first axial side and a second axial side in an axial direction of the shift lever relative to the shift lever base member, the shift lever being arranged to move from a reference position that the shift lever movable member is positioned on the first axial side at a neutral position of the X-axis direction, through an N-position that the shift lever movable member is positioned on the second axial side at the neutral position of the X-axis direction, to one of a pair of positions that are located on both sides of the N-position in the X-axis direction; an urging member arranged to urge the shift lever movable member to the first axial side toward or away from the shift lever base member; and a detent pin provided to the shift lever movable member, the detent pin extending substantially parallel to the shift shaft of the shift lever base member, the housing including a guide groove arranged to guide the detent pin along the Z-axis direction so as to guide the shift lever movable member only from the N-position to the reference position when the shift lever movable member is positioned on the second axial side.

DETAILED DESCRIPTION OF THE INVENTION

Hereinafter, shift lever apparatuses according to embodiments of the present invention are illustrated.

(a) First Embodiment

Figure 1:
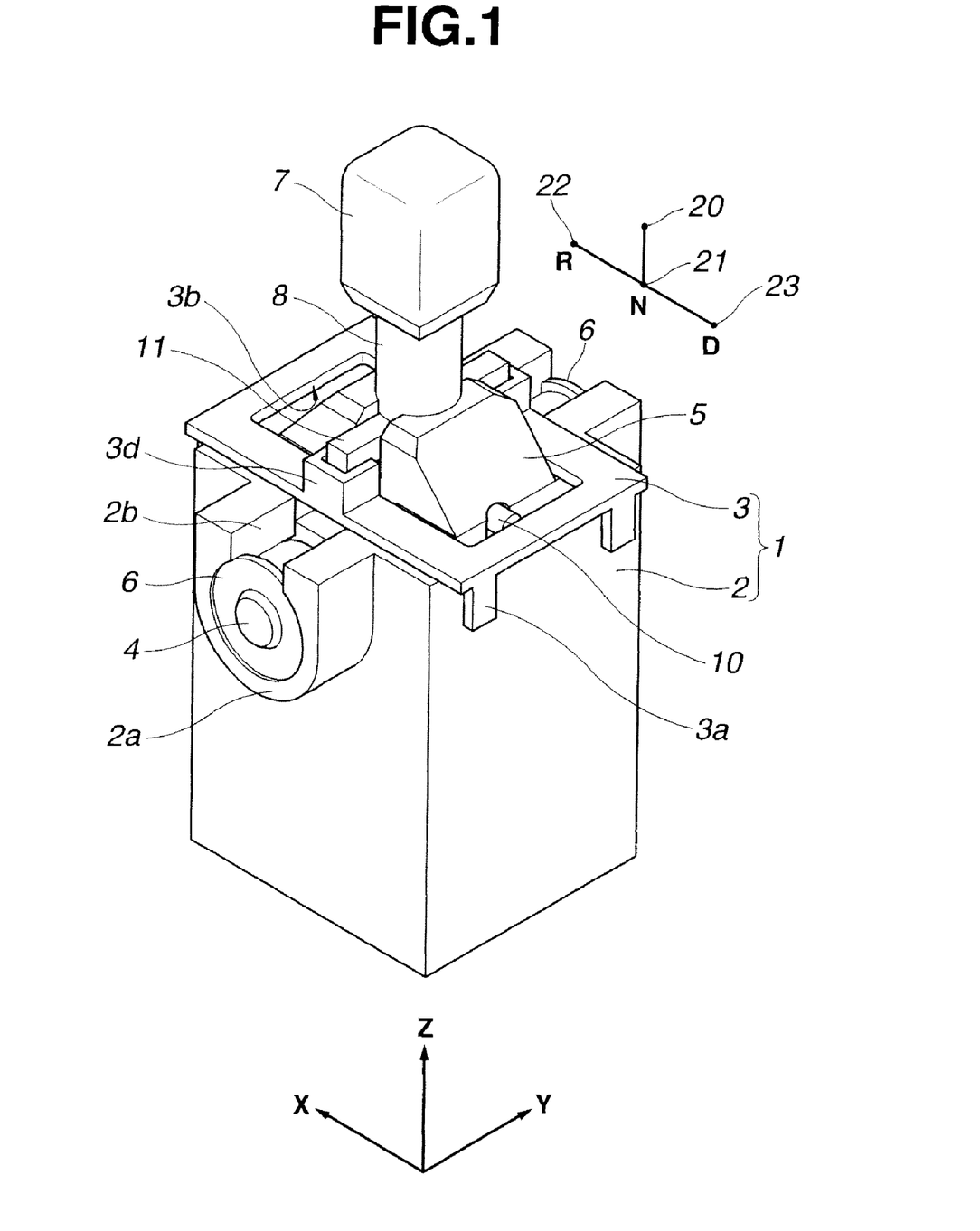
FIG. 1 is a perspective view showing a shift lever apparatus according to a first embodiment of the present invention.
Figure 2:
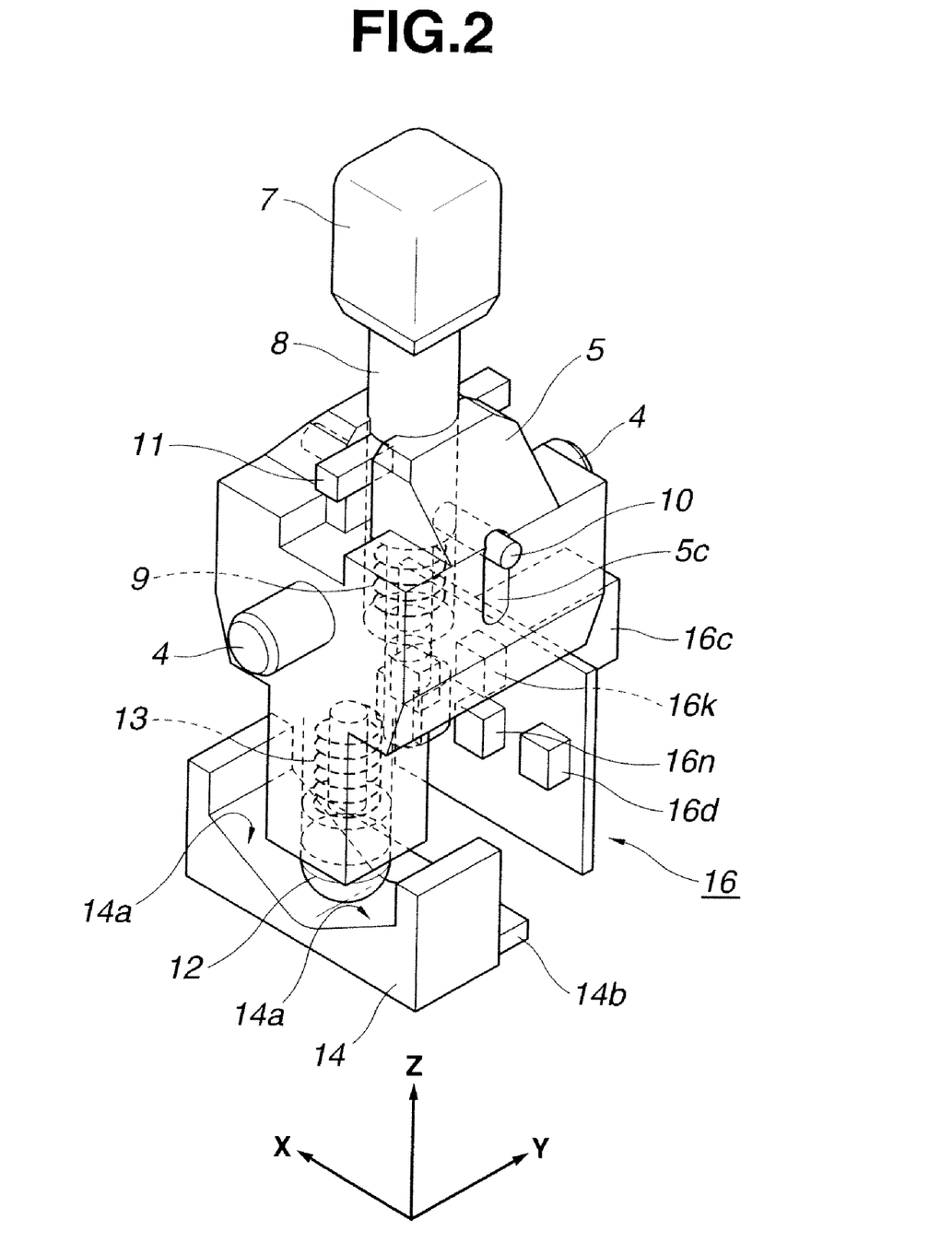
FIG. 2 is a perspective view showing the shift lever apparatus of FIG. 1 from which a housing is detached.
Figure 3:
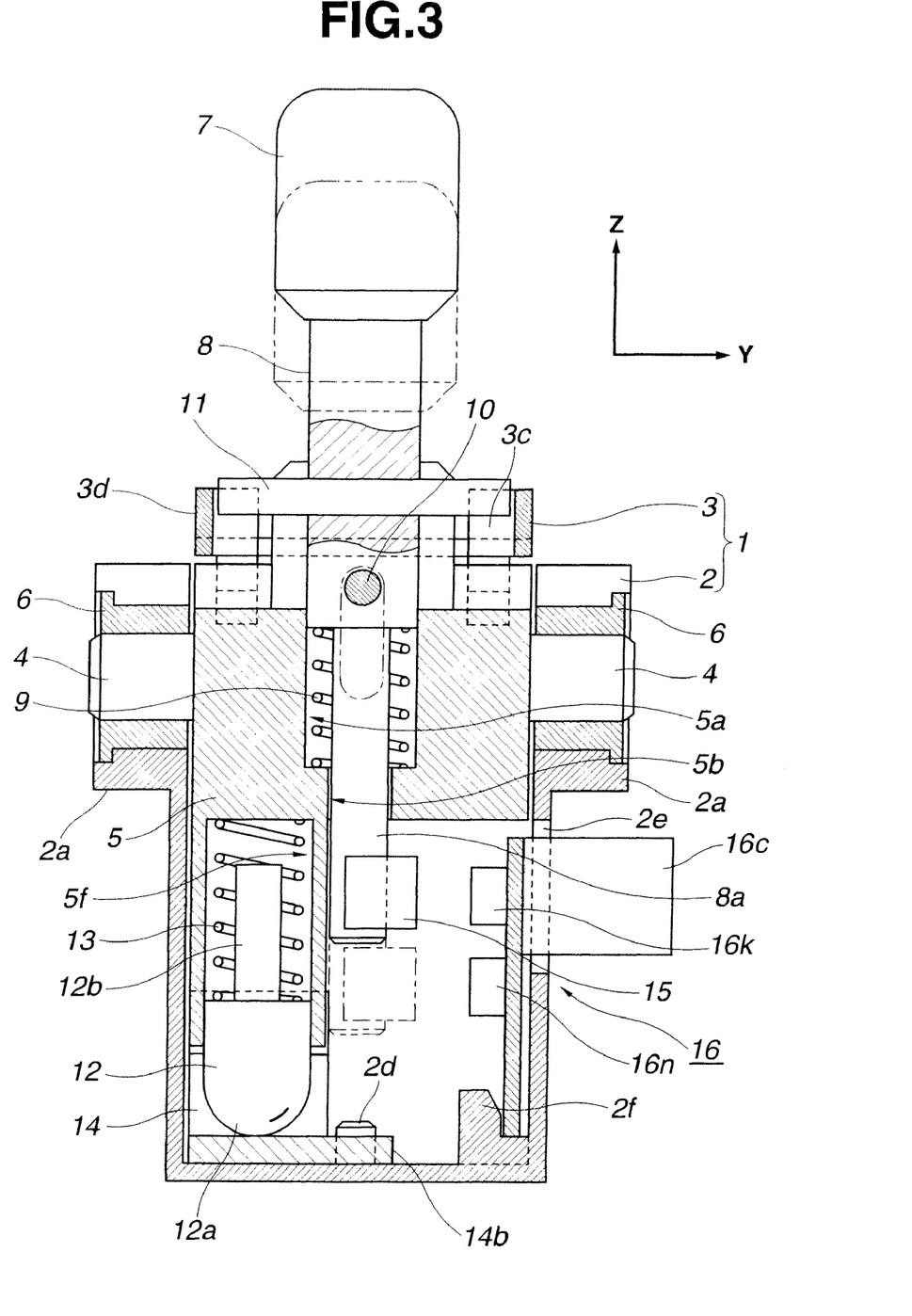
FIG. 3 is a front sectional view showing the shift lever apparatus of FIG. 1.
Figure 4:
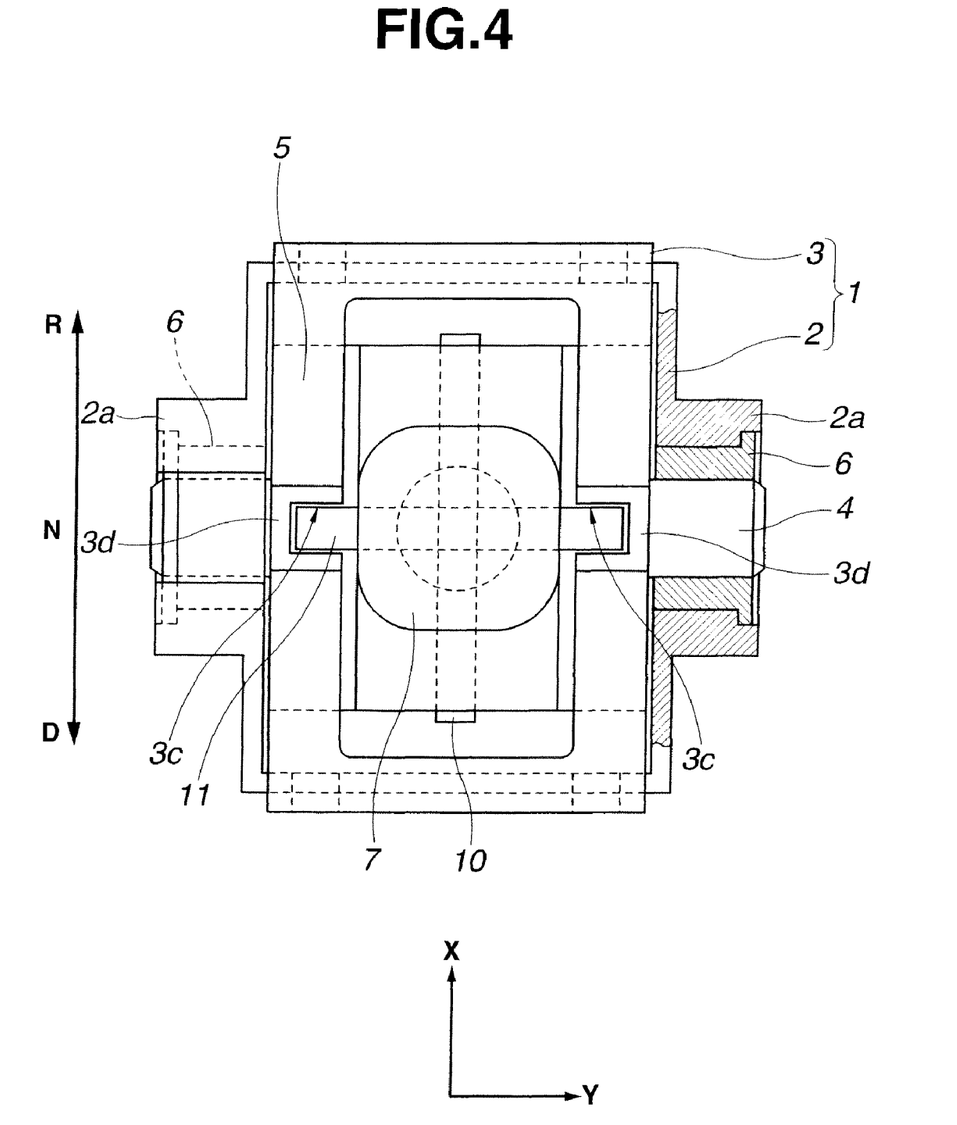
FIG. 4 is a plan view showing the shift lever apparatus of FIG. 1.
Figure 5:
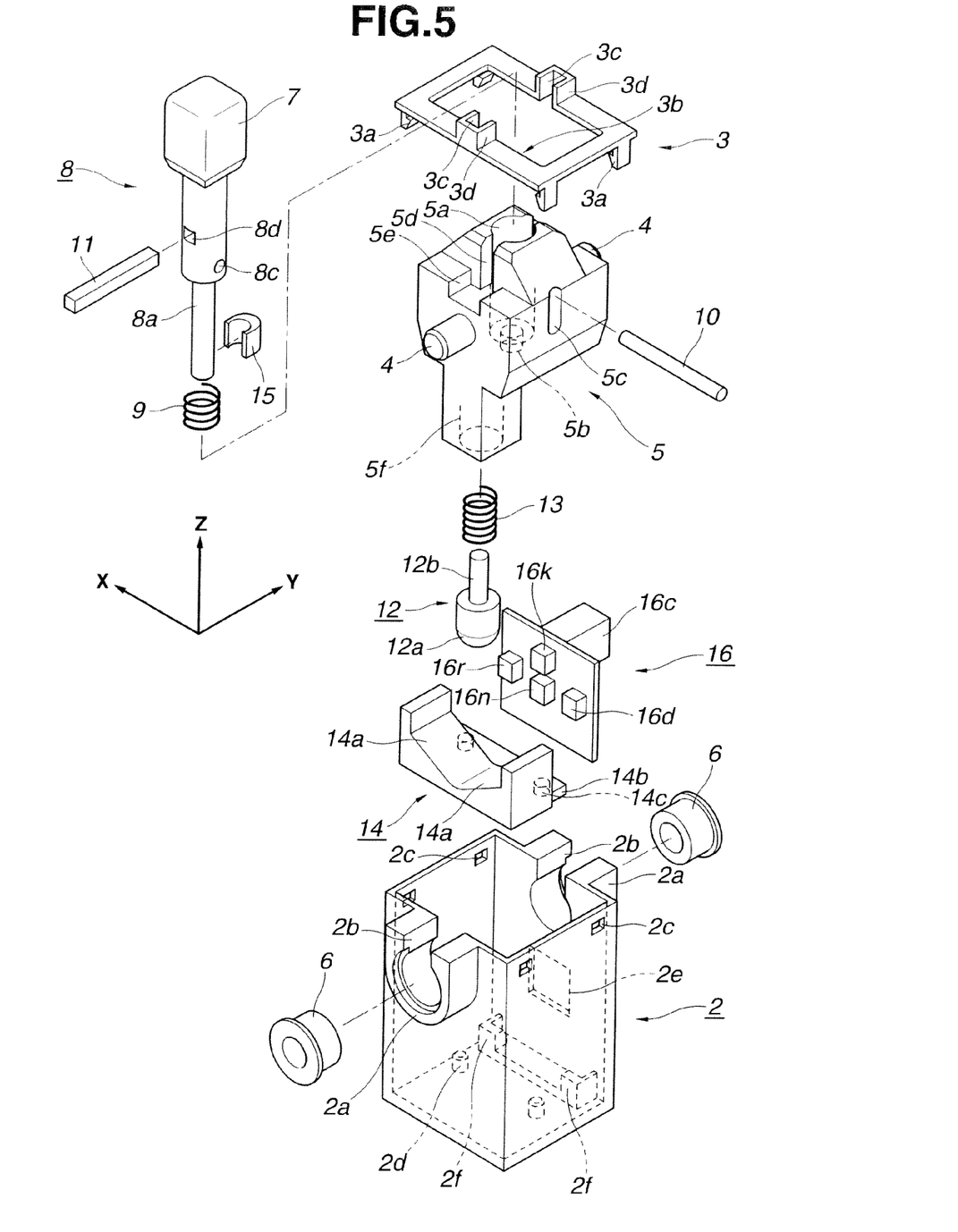
FIG. 5 is an exploded perspective view showing the shift lever apparatus of FIG. 1.
Figure 6:
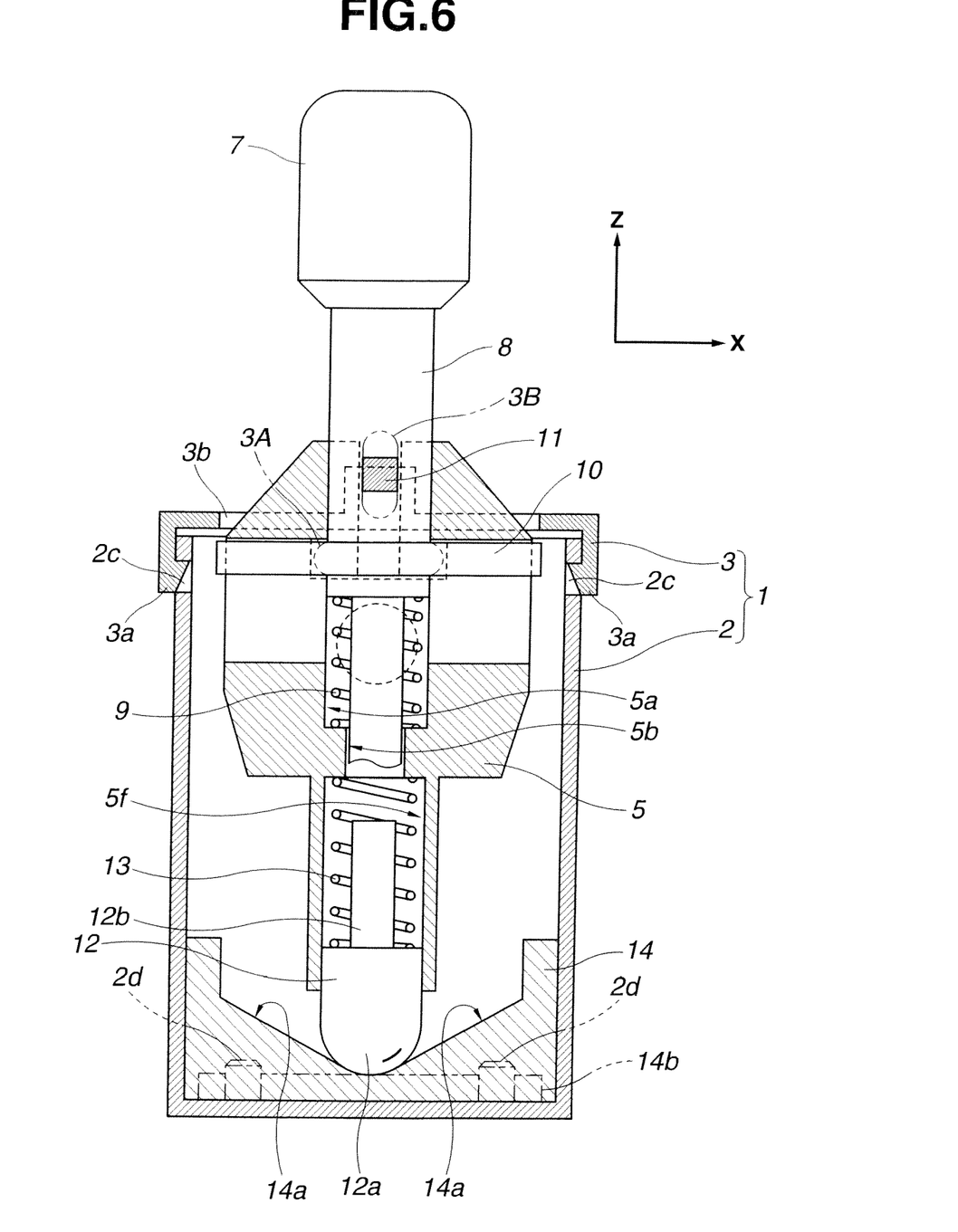
FIG. 6 is an illustrative view showing the shift lever apparatus of FIG. 1 when a shift position is a reference position.
Figure 7:
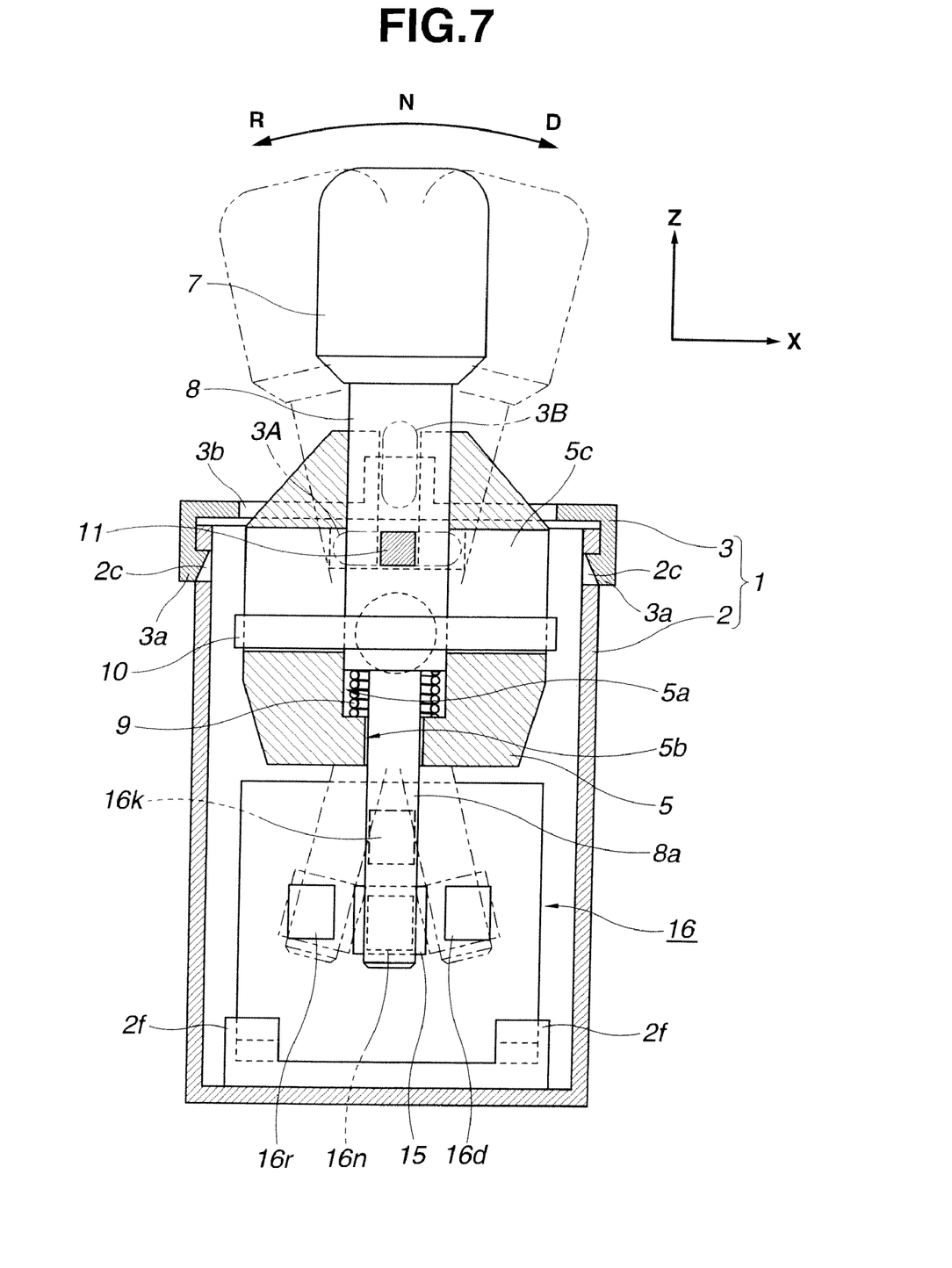
FIG. 7 is an illustrative view showing the shift lever apparatus of FIG. 1 when the shift position is an N-position.

First, a shift lever apparatus according to a first embodiment of the present invention is illustrated. FIGS. 1 and 2 are perspective views showing the shift lever apparatus according to the first embodiment. FIG. 3 is a front sectional view showing the shift lever apparatus of FIG. 1. FIG. 4 is a plan view showing the shift lever apparatus of FIG. 1. FIG. 5 is an exploded perspective view showing the shift lever apparatus of FIG. 1. FIGS. 6 and 7 are views for illustrating operations of the shift lever apparatus of FIG. 1.

(Structure) As shown in FIG. 1, there is formed a three-dimensional space constituted by an X-axis, a Y-axis, and a Z-axis. A housing 1 is provided in this three-dimensional space. In this embodiment, the X-axis represents forward and rearward directions of a vehicle body. The Y-axis represents leftward and rightward directions of the vehicle body. The Z-axis represents upward and downward directions of the vehicle body.

The housing 1 includes a housing body 2 having an opening formed in an upper surface thereof; and a guide plate 3 for closing the opening of the housing body 2. The shift lever apparatus includes a shift lever base member 5 disposed within the housing 1. The shift lever base member 5 extends in the Z-axis (the upward and downward directions). The shift lever base member 5 includes a shift shaft 4 formed integrally with the shift lever base member 5. The shift shaft 4 extends substantially parallel with the Y-axis (the leftward and rightward directions). The shift lever base member 5 is arranged to pivot about the shift shaft 4 in the X-axis direction (the forward and rearward directions). As shown in FIG. 5, the housing body 2 includes cylindrical hollow portions 2a formed, respectively, at upper portions of left and right side walls of the housing body 2. Each of the cylindrical hollow portions 2a has an inside diameter sufficiently larger than an outside diameter of the shift shaft 4. The housing body 2 includes insertion opening portions 2b formed, respectively, above the cylindrical hollow portions 2a of the housing body 2. Each of the insertion opening portions 2b has a width (in the X-axis direction) slightly larger than the outside diameter of the shift shaft 4. The shift shaft 4 is inserted through insertion opening portions 2b into the cylindrical hollow portions 2a. Bushes 6 are inserted, respectively, between the cylindrical hollow portions 2a and the shift shaft 4 from the axial direction so as to support the shift shaft 4 to prevent the shift shaft 4 from detaching from the cylindrical hollow portions 2a. Each of the bushes 6 has an inside diameter slightly larger than the outside diameter of the shift shaft 4.

The shift lever apparatus includes a cylindrical shift lever movable member 8 arranged to move in the axial direction relative to the shift lever base member 5. A knob 7 is provided to the shift lever movable member 8. The shift lever base member 5 includes a larger diameter hole 5a extending in the Z-axis direction from an upper surface of the shift lever base member 5 to a midway portion; and a smaller diameter hole 5b penetrating a bottom portion of the larger diameter hole 5a. The shift lever movable member 8 includes a smaller diameter portion 8a formed at a lower portion of the shift lever movable member 8. A spring 9 is provided to surround the smaller diameter portion 8a of the shift lever movable member 8. The spring 9 serves as an urging section. The shift lever movable member 8 is inserted into larger diameter hole 5a of the shift lever base member 5, and the smaller diameter portion 8a of the shift lever movable member 8 is inserted into the smaller diameter hole 5b of the shift lever base member 5. The shift lever movable member 8 is urged by the spring 9 in the upward direction away from the shift lever base member 5. Moreover, the shift lever movable member 8 includes a smaller diameter portion (not shown) formed at an upper portion of the shift lever movable member 8. This smaller diameter portion of the shift lever movable member 8 is fit in a hole (not shown) formed in a lower surface of the knob 7, and fixed by a screw (not shown).

For setting a stroke (range) of the movement of the shift lever movable member 8 urged by the spring in the upward direction relative to the shift lever base member 5, the shift lever movable member 8 includes a circular mounting hole 8c extending in the X-axis direction (the forward and rearward directions), and a stroke pin 10 is fit in the mounting hole 8c of the shift lever movable member 8. Moreover, the shift lever base member 5 includes an elongated hole 5c extending in the Z-axis direction, and extending in the X-axis direction from the outer surface of the shift lever base member 5 to the larger diameter hole 5a. Both end portions of the stroke pin 10 are inserted into elongated holes 5c of the shift lever base member 5.

The shift lever movable member 8 can be positioned on a first axial side (upper side) and a second axial side (lower side). The shift lever movable member 8 is urged to the first axial side by the spring 9 in the axial direction of the shift lever. The shift lever movable member 8 can be positioned at three positions in the X-axis direction (the pivot direction) on each of the first and second axial sides (upper and lower sides). However, in the shift lever apparatus of this example, the shift lever can be positioned at a reference position that the shift lever movable member 8 is positioned on the first axial side (upper side) at a neutral position of the X-axis direction. The shift lever can be positioned at an N-position 21 that shift lever movable member 8 is positioned on the second axial side (lower side) at the neutral position of the X-axis direction. Moreover, the shift lever can be positioned at an R-position 22 and a D-position 23 that shift lever movable member 8 is positioned on the second axial side (lower side) on forward and rearward sides of the N-position 21. Consequently, the shift lever is arranged to move (shift) from the reference position 20 through the N-position 21 to the R-position 22 or the D-position 23.

For setting the above-described four positions, the shift lever movable member 8 includes a square-shaped mounting hole 8d extending in the Y-axis direction as shown in FIG. 5, and a detent pin 11 is inserted into the mounting hole 8d of the shift lever movable member 8. The detent pin 11 has a substantially square cross section. The detent pin 11 extends substantially parallel with the shift shaft 4. This detent pin 11 is inserted into cutaway portions 5d and 5e formed on an upper surface of the shift lever base member 5 in the Y-axis direction, and arranged to move in the axial direction of the shift lever.

The guide plate 3 is provided so that the detent pin 11 is moved through the N-position 21 between the reference position 20, the R-position 22 and the D-position 23. The guide plate 3 is provided to close the upper opening of the housing body 2, as shown in FIG. 6. As shown in FIG. 5, the guide plate 3 includes four claws 3a each confronting the corresponding one of the claws 3a. The four claws 3a are arranged to engage with four engagement holes 2c formed at the upper portion of the housing body 2 at the forward and rearward positions.

The guide plate 3 includes a rectangular opening portion 3b formed at a substantially central portion of the guide plate 3, and arranged to receive the shift lever movable member 8. At a portion which is below the guide plate 3, and which is surrounded by the four claws 3a, there is formed a second axial side (lower side) receiving space 3A arranged to allow the swing movement of the detent pin 11 about the shift shaft 4 when the shift lever movable member 8 is positioned on the second axial side (lower side) in the Z-axis direction and the shift position is in the N-position, the R-position or the D-position. Moreover, the guide plate 3 includes guide grooves 3c arranged to guide the detent pin 11 in the Z-axis direction only from the N-position which is the neutral position, to the reference position which is the neutral position on the first axial side. That is, the guide plate 3 includes U-shaped guide portions 3d formed integrally on the upper surface of the guide plate 3 on the both sides of the guide plate 3 in the Y-axis direction to penetrate parts of the guide plate 3, as shown in FIG. 5. Each of the guide portions 3d defines one of the guide grooves 3c. The guide portions 3d form a first axial side (upper side) receiving space 3B in which the detent pin 11 is positioned when the shift position is the reference position.

Moreover, there is provided a neutral position return section arranged so that the shift lever base member 5 is pivoted about the shift shaft 4, and returned to the neutral position when the knob 7 is released, and then the shift lever movable member 8 is moved by the urging force of the spring 9 from the second axial side (lower side) to the first axial side (upper side), and returned to the reference position 20. The neutral position return section is constituted as follows. As shown in FIG. 3, the shift lever base member 5 includes a protruding portion which is located at a position which is offset from a center of the shift lever base member 5 in the leftward direction of the Y-axis, and which extends downwards; and a receiving hole 5f which has a circular section, and which extends in the protruding portion from the lower surface of the protruding portion in the axial direction of the shift lever. Moreover, the shift lever apparatus includes a check pin 12 having a semiround portion 12a located at a lower portion of the check pin 12, and a shaft portion 12b located at an upper portion of the check pin 12. A spring 13 surrounds the shaft portion 12b. The check pin 12 is received through the spring 13 in the receiving hole 5f of the shift lever base member 5. Moreover, there is provided a check block 14 disposed at the bottom portion of the housing 2, and arranged to return the check pin 12 urged downwards by the spring 13, to the neutral position. The check block 14 includes a mounting portion 14b located on one side of the check block 14 to protrude in the Y-axis direction; and a pair of mounting holes 14c formed on the mounting portion 14b. The housing body 2 includes a pair of positioning pins 2d integrally formed with the bottom portion of the housing body 2. The positioning pins 2d of the housing body 2 are fit, respectively, in the mounting holes 14c of the check block 14. This check block 14 includes a recessed portion formed on an upper surface of the check block 14. A pair of taper surfaces 14a, 14a are formed on the recessed portion of the check block 14. The pair of the taper surfaces 14a, 14a are formed so that a central portion (in the X-axis direction) of the recessed portion of the check block 14 becomes lowest.

Next, a structure to sense the shift position is illustrated. As shown in FIG. 3, an end portion of the shift lever movable member 8 on the second axial side (lower side) penetrates the shift lever base member 5. A U-o shaped magnet 15 is provided at this end portion of the shift lever movable member 8. The magnet 15 is a sensed member. On the other hand, a sensor switch 16 is disposed on an inner wall surface of the housing body 2. The sensor switch 16 is arranged to sense an approach or proximity of the magnet 15 by non-contact way. The sensor switch 16 includes detection sensors 16n, 16r and 16d which are located, respectively, at positions to confront the magnet 15 when the shift lever movable member 8 is on the second axial side (lower side) and the shift position is the N-position 21, the R-position 22 and the D-position 23. Moreover, the sensor switch 16 includes a detection sensor 16k which is located at a position to confront the magnet 15 when the shift lever movable member 8 is on the first axial side (upper side) and the shift position is the reference position 20. The sensor switch 16 is supported on a pair of support portions 2f formed on the bottom surface within the housing body 2. A connector 16c of the sensor switch 16 is fit in a rectangular hole 2e formed on a back surface of the housing body 2.

(Operation) Next, operation of the shift lever apparatus is illustrated. In the shift lever apparatus of this example, in a case in which the knob 7 is pushed against the urging force of the spring 9 in the downward direction (the Z-axis direction) which is the second axial side direction of the axial direction of the shift lever when the shift position is the reference position 20, the shift position is moved from the reference position 20 to the N-position 21 as shown in FIG. 7. Then, when the knob 7 is moved along the X-axis direction in the forward or rearward direction of the vehicle, the shift position is moved to R-position or the D-position 23. Then, when the hand is released from the knob 7, the check pin 12 is pushed by the spring 13 against the taper surfaces 14a, 14a of the check block 14. Consequently, the shift position is moved to the N-position 21. In this case, the detent pin 11 is positioned at a central position of the second axial side receiving space 3A. Accordingly, the shift lever movable member 8 is moved along the guide grooves 3c in the upward direction which is on the first axial side, relative to the shift lever base member 5. Consequently, the detent pin 11 is moved from the second axial side receiving space 3A into the narrow first axial side receiving space 3B, and returned to the state of FIG. 6. That is, the shift position is automatically returned from the R-position 22 or the D-position 23 through the N-position 21 to the reference position 20.

In the shift lever apparatus of this example, when the shift position is moved from the reference position 20 through the N-position 21 to the R-position 22 or the D-position 23 which is one of the pair of the positions and then the shift position is again returned through the N-position 21 to the reference position 20, the detection sensors 16k, 16n 16r and 16d disposed, respectively, at the positions to correspond to the reference position 20, the N-position 21, the R-position 22 and the D-position 23 sense the approach of the magnet 15, so that the shift position is sensed.

In the shift lever apparatus of this example, when the knob 7 is moved in the axial direction of the shift lever and then moved in the X-axis direction of the shift lever, the shift position can be moved to, for example, the R-position 22 or the D-position 23 which is one of the pair of the positions. Accordingly, it is unnecessary to provide a structure to move the shift lever in the Y-axis direction (the leftward and rightward directions), to the shift lever apparatus. Therefore, it is possible to simplify the structure of the shift lever apparatus, and to decrease the width (size) in the leftward and rightward directions.

Moreover, when the shift position is the reference position 20 while the vehicle runs, the detent pin 20 is positioned in the guide grooves 3c. Accordingly, the knob 7 is not moved to the other positions even when the force in the X-axis direction (shift direction) or the Y-axis direction (leftward and rightward directions) is suddenly acted to the knob 7.

Furthermore, when the shift position is moved from the reference position 20 through the N-position 21 to the R-position 22 or the D-position 23 which is the pair of the positions and then returned through the N-position 21 to the reference position, the detection sensors 16k, 16n, 16r and 16d disposed at the positions corresponding to the reference position 20, the N-position 21, the R-position 22 and the D-position 23 sense the approach of the magnet 15, so that the shift position is sensed.

(b) Second Embodiment

Figure 8:
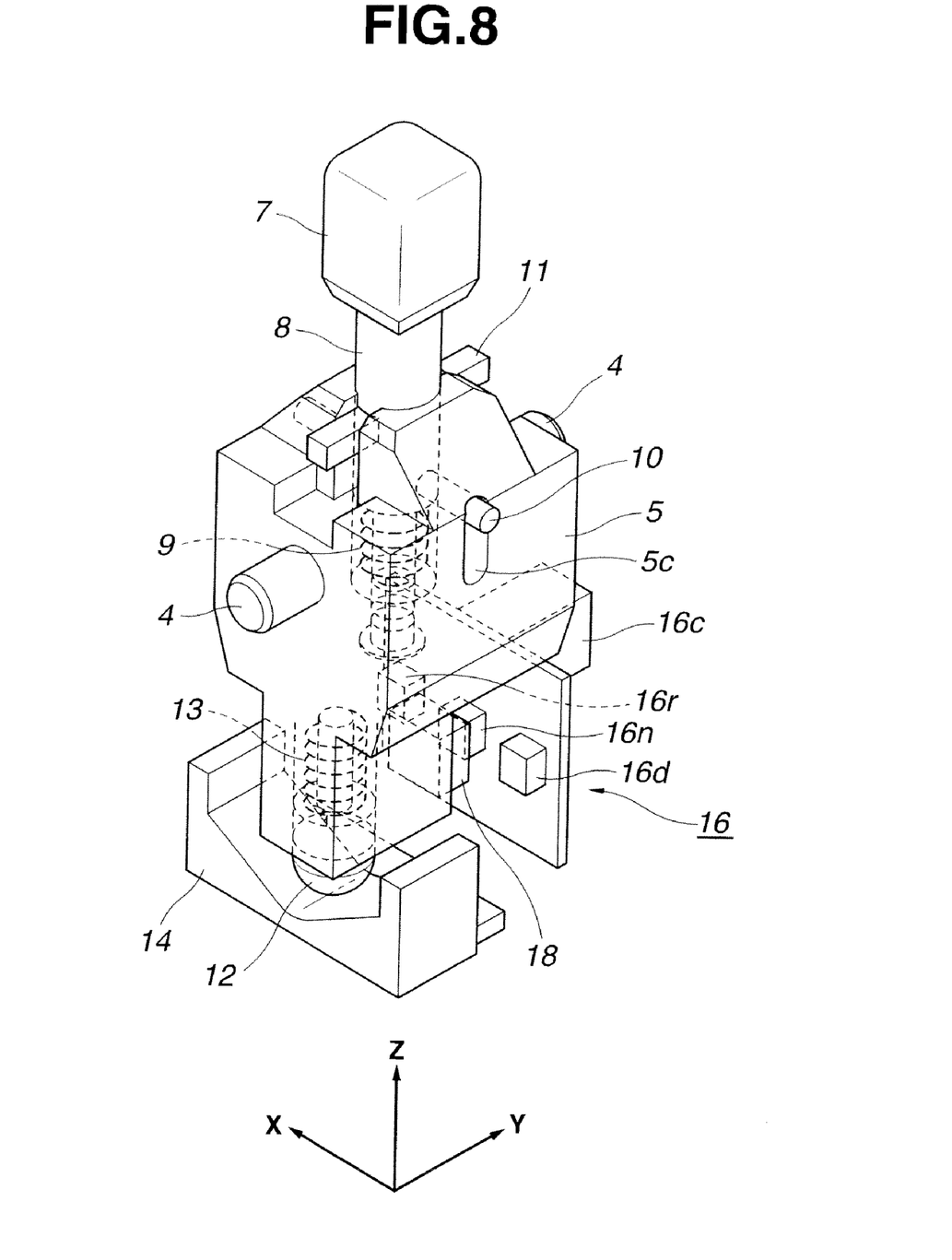
FIG. 8 is a perspective view showing a shift lever apparatus according to a second embodiment of the present invention, from which a housing is detached.
Figure 9:
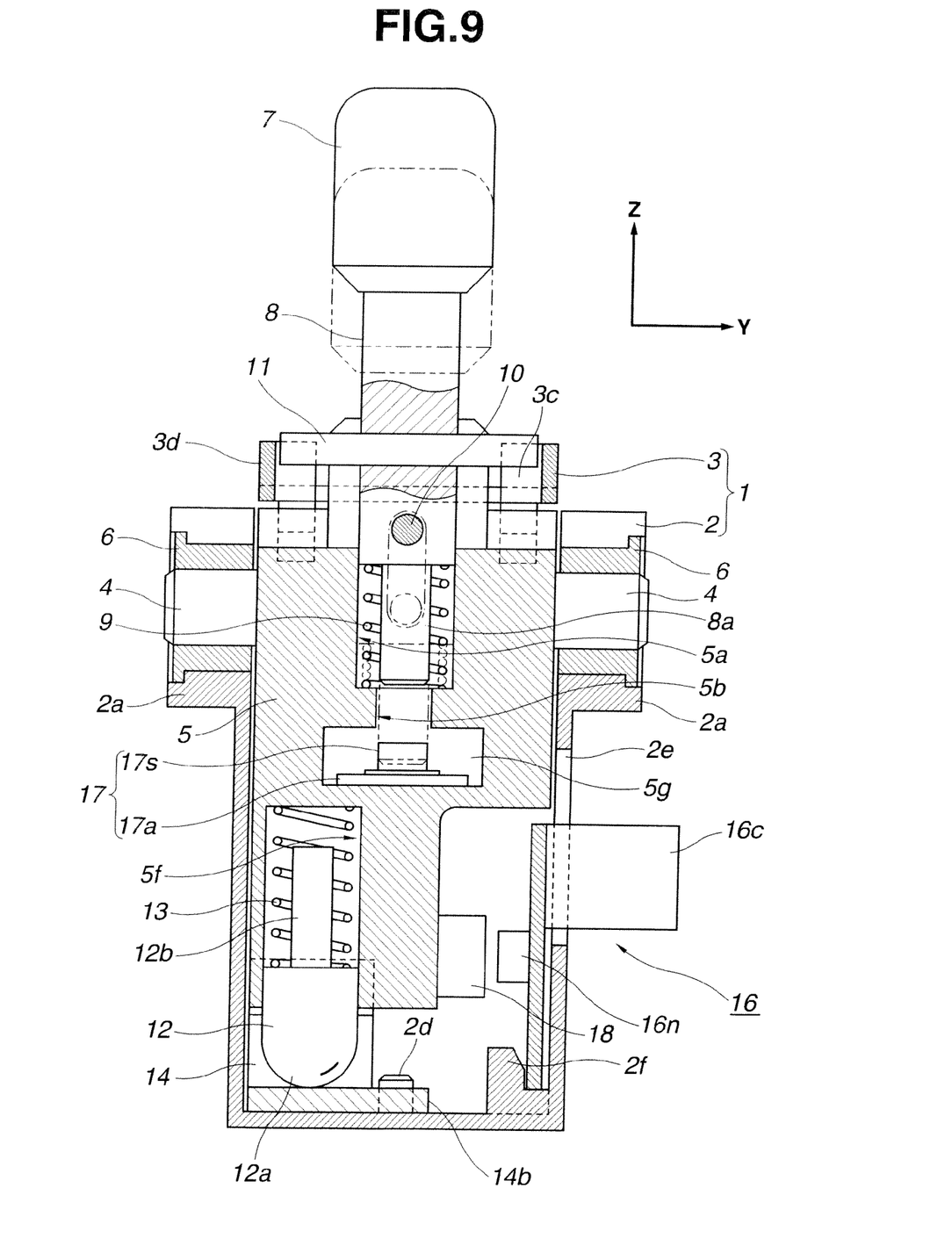
FIG. 9 is a front sectional view showing the shift lever apparatus of FIG. 8.
Figure 10:
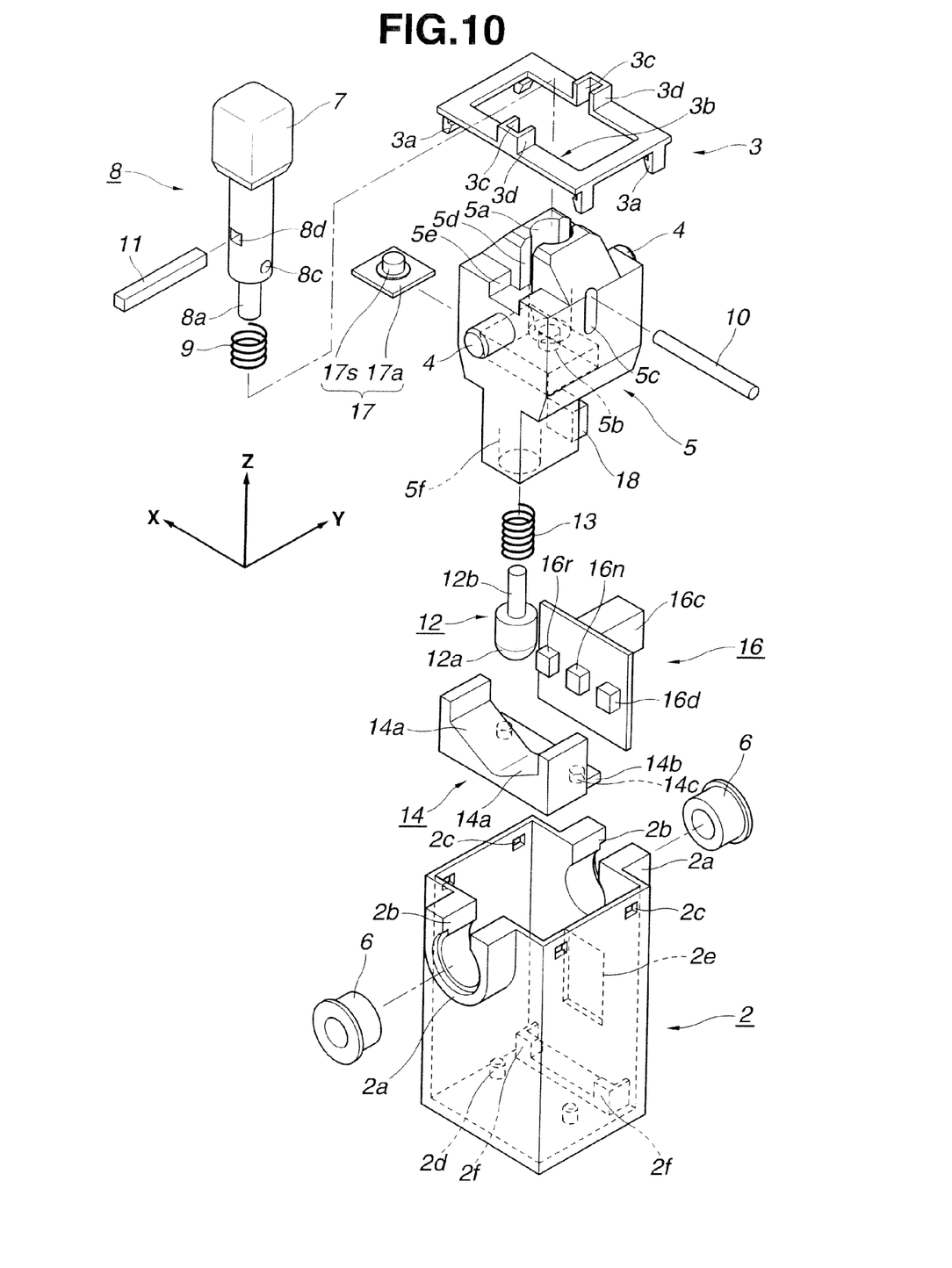
FIG. 10 is an exploded perspective view showing the shift lever apparatus of FIG. 8.
Figure 11:
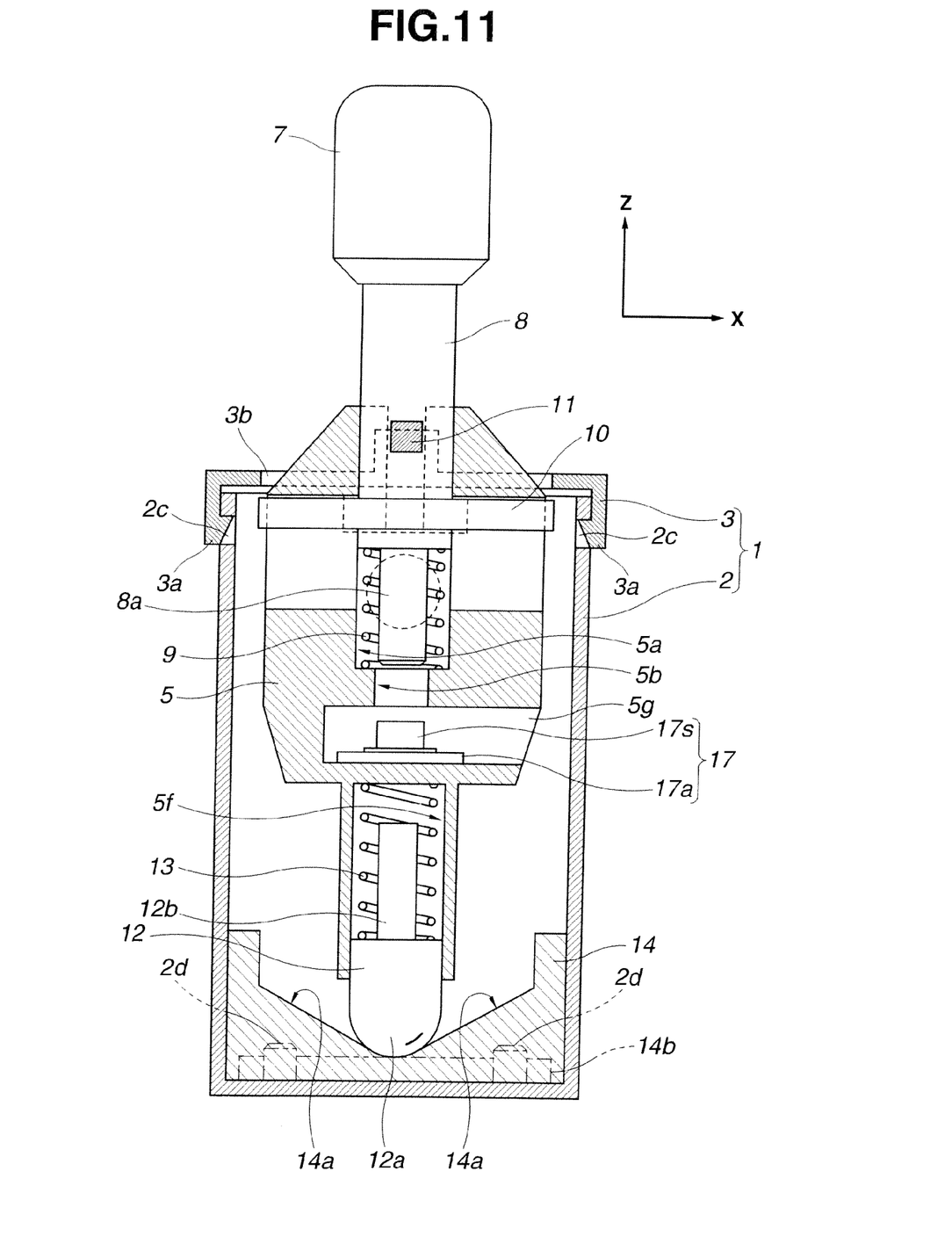
FIG. 11 is an illustrative view showing the shift lever apparatus of FIG. 8 when a shift position is a reference position.
Figure 12:
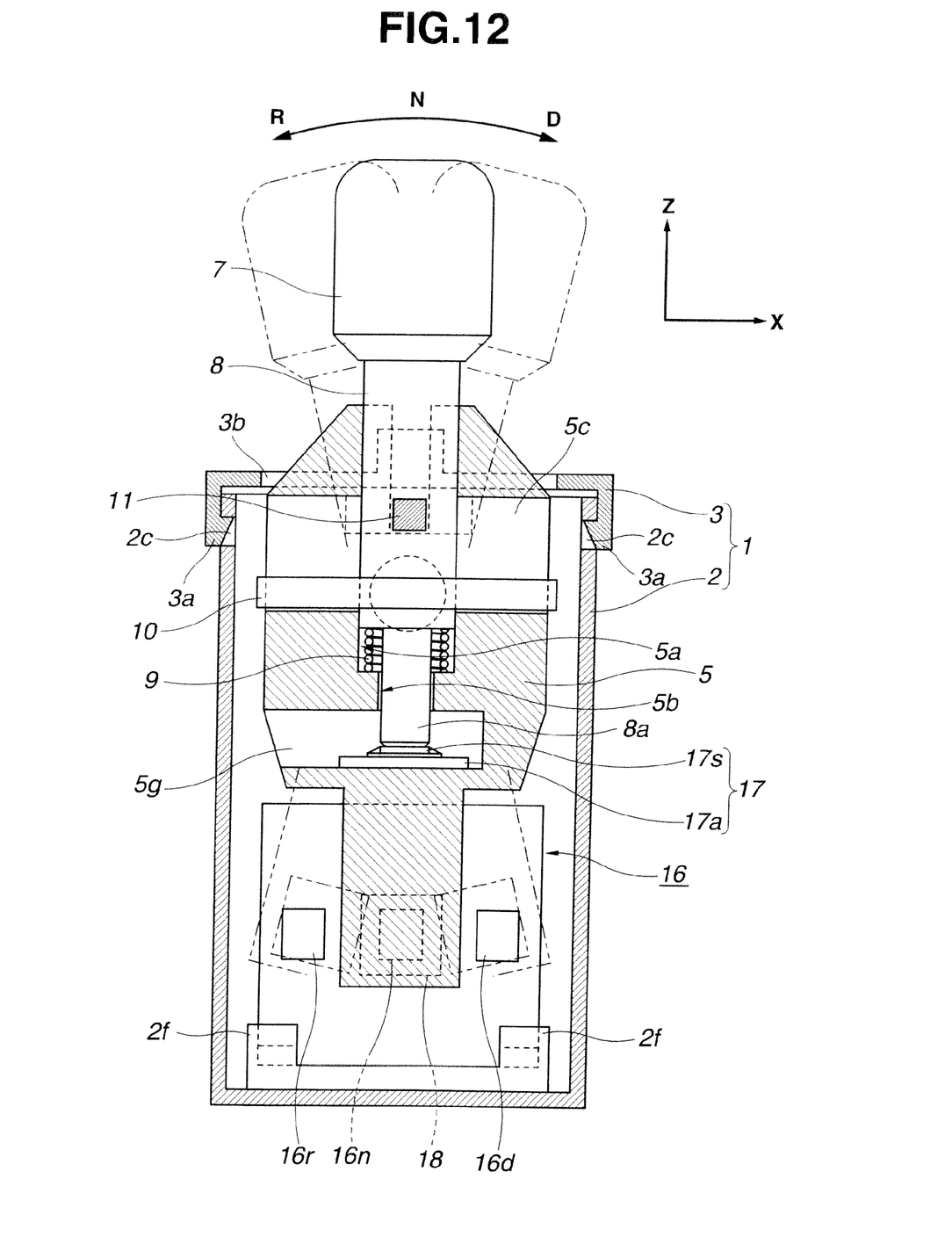
FIG. 12 is an illustrative view showing the shift lever apparatus of FIG. 8 when the shift position is an N-position.

Next, a shift lever apparatus according to a second embodiment of the present invention is illustrated. The following explanation is directed only to points different from the first embodiment, and repetitive explanation is omitted as to similar component parts to which the same reference numerals are given. FIG. 8 is a perspective view showing the shift lever apparatus according to the second embodiment. FIG. 9 is a front sectional view showing the shift lever apparatus of FIG. 8. FIG. 10 is an exploded perspective view showing the shift lever apparatus of FIG. 8. FIGS. 11 and 12 are views for illustrating operation of the shift lever apparatus of FIG. 8.

In the shift lever apparatus of the first embodiment, the central lower portion of the shift lever base member 5 is penetrated by the shift lever movable member 8, as shown in FIG. 3. On the other hand, in the shift lever apparatus of the second embodiment, the central lower portion of the shift lever base member 5 is closed as shown in FIG. 9. The shift lever base member 5 includes a side hole 5g formed in the X-axis direction at a substantially central portion of the shift lever base member 5, as shown in FIG. 11. Moreover, the shift lever base member 5 includes the larger diameter hole 5a extending from the upward direction in the axial direction of the shift lever which is the Z-axis direction; and the smaller diameter hole 5b extending from the larger diameter hole 5a toward the side hole 5g, like the first embodiment. The spring 9 is provided to surround the smaller diameter portion 8a of the shift lever movable member 8.

Next, the structure to sense the shift position is illustrated. The shift lever apparatus includes a sensor switch 17 mounted on a bottom surface within the side hole 5g. The sensor switch 17 includes a base plate (substrate) 17a, and a pressure sensor 17s attached and fixed on an upper surface of the base plate 17a. The pressure sensor 17s is arranged to sense that the shift lever movable member 8 is positioned on the second axial side (lower side) of the axial direction of the shift lever. The pressure sensor 17s is a contact type to be pressed by the lower end (second axial end) of the shift lever movable member 8 on the second axial side.

The magnet 18 is provided on the side surface of the lower portion of the shift lever base member 5. The magnet 18 is a sensed member for sensing the shift position in the X-axis direction. The sensor switch 16 is provided on an inner wall surface of the housing body 2. The sensor switch 16 is arranged to sense the approach of the magnet 18 by the non-contact way. The sensor switch 16 of the first embodiment includes the detection sensors 16k, 16n, 16r and 16d. On the other hand, the sensor switch 16 of the second embodiment includes the detection sensors 16n, 16r and 16d only.

In the shift lever apparatus of the second embodiment, the pressure sensor 17s senses the position (the first axial side (upper side) or the second axial side (lower side)) of the shift lever movable member 8 in the axial direction of the shift lever. The detection sensors 16n, 16r and 16d sense the approach of the magnet 18, and senses the positions of the shift lever movable member 8 in the X-axis direction. Therefore, by combination of the detection of the pressure sensor 17s and the detection of the detection sensors 16n, 16r and 16d, it is judged that the shift position is the reference position 20, the N-position 21, the R-position 22, or the D-position 23.

In the shift lever apparatus according to the first and second embodiments, when the knob of the shift lever movable member is pressed along the axial direction (the Z-axis direction) of the shift lever in the downward direction which is the second axial side, and then moved along the X-axis direction in the forward or rearward direction of the vehicle, the shift position is moved to the R-position or the D-position. However, the knob 7 may be pulled up along the axial direction (Z-axis direction) of the shift lever in the upward direction which is the first axial side, and then moved along the X-axis direction in the forward or rearward direction of the vehicle, so that the shift position may be moved to the R-position or the D-position. Moreover, in the shift lever apparatus according to the first and second embodiments, the housing is disposed on a floor surface, the X-axis is set to the forward and rearward directions of the vehicle body, and the Z-axis is set to the upward and downward directions. However, the housing may be disposed on a front panel, the X-axis is set to the upward and downward directions, and the Z-axis is set to the forward and rearward directions of the vehicle body. That is, the X-axis is set along the surface of the front panel on which the housing is disposed. Moreover, in the shift lever apparatus of the second embodiment, a non-contact type sensor may be used in place of the pressure sensor 17s of the contact type. Moreover, in the second embodiment, the sensor switch 17 is provided only on the second axial side of the Z-axis. However, the sensor switch 17 may be disposed on the first axial side of the Z-axis.

The shift lever apparatus according to the embodiment of the present invention includes a housing (1;2,3) disposed within a vehicle body in a three dimensional space constituted by an X-axis, a Y-axis and a Z-axis, the Y-axis being leftward and rightward directions of the vehicle body; a shift lever including; a shift lever base member (5) extending in the Z-axis direction within the housing (2,3), and including a shift shaft (4) extending substantially parallel to the Y-axis, the shift lever base member (5) being arranged to pivot about the shift shaft (4) in the X-axis direction, and a shift lever movable member (8) provided with a knob (7), and arranged to move between a first axial side and a second axial side in an axial direction of the shift lever relative to the shift lever base member (5), the shift lever being arranged to move from a reference position (20) that the shift lever movable member (8) is positioned on the first axial side at a neutral position of the X-axis direction, through an N-position (21) that the shift lever movable member (8) is positioned on the second axial side at the neutral position of the X-axis direction, to one of a pair of positions (22(R),23(D)) that are located on both sides of the N-position (21) in the X-axis direction; an urging member (9) arranged to urge the shift lever movable member (8) to the first axial side toward or away from the shift lever base member (5); and a detent pin (11) provided to the shift lever movable member (8), the detent pin (11) extending substantially parallel to the shift shaft (4) of the shift lever base member (5), the housing (2,3) including a guide groove (3c) arranged to guide the detent pin (11) along the Z-axis direction so as to guide the shift lever movable member (8) only from the N-position (21) to the reference position (20) when the shift lever movable member (8) is positioned on the second axial side.

Accordingly, when the knob is pressed against the urging force of the urging member in the second axial side (the lower side) of the Z-axis direction, the shift position is moved from the reference position to the N-position. Then, when the knob is moved in one direction of the X-axis direction, the shift position can be moved to one of the pair of the positions such as the R-position and the D-position. Then, the shift position is returned from the D-position or the R-position through the N-position to the reference position.

In the shift lever apparatus according to the embodiments of the present invention, the shift lever movable member (8) includes a first end portion which is on the first axial side, and a second end portion which is on the second axial side; the second end portion of the shift lever movable member (8) penetrates the shift lever base member (5); and the shift lever apparatus further comprises a sensed member (15) mounted on the second end portion of the shift lever movable member (8), and detection sensors (16k,16r,16n,16d) disposed, respectively, at positions to correspond to the reference position (20), the N-position (21), the D-position (23) and the R-position (22) (the pair of the positions), on an inner wall surface of the housing (2), and arranged to sense an approach of the sensed member (15), and to sense a position of the shift lever.

Accordingly, when the shift position is moved from the reference position through the N-position to the pair of the positions such as the R-position and the D-position, and then the shift position is returned through the N-position to the reference position, the detection sensors disposed, respectively, at positions to correspond to the reference position, the N-position, the R-position and the D-position sense the approach of the sensed member, so that the shift position is sensed.

In the shift lever apparatus according to the embodiments of the present invention, the shift lever movable member (8) includes a first end portion which is on the first axial side, and a second end portion which is on the second axial side; the shift lever apparatus further comprises a pressure sensor (17s) provided to the shift lever base member (5), and arranged to be pressed by the second end portion of the shift lever movable member (8), and thereby to sense that the shift lever movable member (8) is positioned on the second axial side of the axial direction of the shift lever, a sensed member (15) mounted on a side surface of the shift lever base member (5), and detection sensors (16r,16n,16d) disposed, respectively, at positions to correspond to the N-position (21), the D-position (23) and the R-position (22) (the pair of the positions), on an inner wall surface of the housing (2), and arranged to sense an approach of the sensed member (15), and thereby to sense the position of the shift lever movable member (8) in the X-axis direction.

Accordingly, the pressure sensor senses whether the shift lever movable member is positioned at a position on first axial side of the Z-axis direction or at a position on the second axial side of the Z-axis direction. The detection sensor senses the approach of the sensed member, and thereby senses the position of the shift lever movable member in the X-axis direction. Therefore, by the combination of the detection of the pressure sensor and the detection of the detection sensors, it is judged (sensed) that the shift position is in the reference position, the N-position, the R-position or the D-position.

Accordingly, when the knob is moved in the Z-axis direction (the axial direction of the shift lever) and then the knob is moved in the X-axis direction (the shift direction), the shift position is moved to one of the pair of the shift positions such as the R-position and the D-position. Consequently, it is unnecessary to provide a structure to move in the Y-axis direction (the leftward and rightward directions), to the shift lever apparatus. Therefore, it is possible to simplify the structure of the shift lever apparatus, and to decrease the size of the shift lever apparatus in the leftward and rightward directions.

Moreover, when the shift position is in the reference position while the vehicle runs, the detent pin is positioned in the guide grooves. Accordingly, the knob is not moved to the another position even when the force in the X-axis direction (shift direction) or in the Y-axis direction (leftward and rightward direction) is accidentally acted to the knob.

The entire contents of Japanese Patent Application No. 2009-84533 filed Mar. 31, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A shift lever apparatus comprising:
a housing within a vehicle body in a three dimensional space constituted by an X-axis, a Y-axis and a Z-axis, the Y-axis being leftward and rightward directions of the vehicle body;
a shift lever including:
a shift lever base member extending in a Z-axis direction within the housing, and including a shift shaft extending substantially parallel to the Y-axis, the shift lever base member arranged to pivot about the shift shaft in an X-axis direction, and
a shift lever movable member with a knob, and arranged to move between a first axial side and a second axial side in the Z-axis direction of the shift lever relative to the shift lever base member,
the shift lever arranged to move from a reference position that the shift lever movable member is on the first axial side at a middle position of the X-axis direction, through an N-position that the shift lever movable member is on the second axial side at the middle position of the X-axis direction, to one of a pair of positions on both sides of the N-position in the X-axis direction;
an urging member arranged to urge the shift lever movable member to the first axial side toward or away from the shift lever base member; and
a detent pin provided to the shift lever movable member, the detent pin extending substantially parallel to the shift shaft of the shift lever base member,
the housing including a guide groove arranged to guide the detent pin along the Z-axis direction so as to guide the shift lever movable member only from the N-position to the reference position when the shift lever movable member is on the second axial side.

2. The shift lever apparatus as claimed in claim 1,
wherein the shift lever movable member includes a first end portion on the first axial side, and a second end portion on the second axial side,
wherein the second end portion of the shift lever movable member penetrates the shift lever base member, and
wherein the shift lever apparatus further comprises a sensed member on the second end portion of the shift lever movable member, and detection sensors, respectively, at positions to correspond to the reference position, the N-position, and the pair of positions, on an inner wall surface of the housing, and arranged to sense an approach of the sensed member, and to sense a position of the shift lever.

3. The shift lever apparatus as claimed in claim 1,
wherein the shift lever movable member includes a first end portion on the first axial side, and a second end portion on the second axial side, and
wherein the shift lever apparatus further comprises a pressure sensor provided to the shift lever base member, and arranged to be pressed by the second end portion of the shift lever movable member, and thereby to sense that the shift lever movable member is on the second axial side of an axial direction of the shift lever, a sensed member on a side surface of the shift lever base member, and detection sensors, respectively, at positions to correspond to the N-position, and the pair of positions, on an inner wall surface of the housing, and arranged to sense an approach of the sensed member, and thereby to sense a position of the shift lever movable member in the X-axis direction.

4. The shift lever apparatus as claimed in claim 1,
wherein the shift lever movable member includes a larger diameter portion extending in the Z-axis direction from a first axial end connected with the knob to a second axial end, and a smaller diameter portion extending in the Z-axis direction from another first axial end connected with the second axial end of the larger diameter portion to another second axial end,
wherein the shift lever base member includes a larger diameter hole extending in the Z-axis direction from a first opening end in a first axial surface of the shift lever base member to a second opening end, and a smaller diameter hole extending in the Z-axis direction from another first opening end connected with the second opening end of the larger diameter hole to another second opening end in a second axial surface of the shift lever base member,
wherein the larger diameter portion of the shift lever movable member is inserted into the larger diameter hole of the shift lever base member,
wherein the urging member surrounds the smaller diameter portion of the shift lever movable member, and
wherein the urging member is in the larger diameter hole of the shift lever base member, abutted on the second axial end of the larger diameter portion of the shift lever movable member and the second opening end of the larger diameter hole of the shift lever base member, and arranged to urge the shift lever movable member away from the shift lever base member.

5. The shift lever apparatus as claimed in claim 4,
wherein the smaller diameter portion of the shift lever movable member penetrates the smaller diameter hole of the shift lever base member, and
wherein the shift lever apparatus further comprises a sensed member mounted on the smaller diameter portion of the shift lever movable member, and detection sensors, respectively, at positions to correspond to the reference position, the N-position, and the pair of positions, on an inner wall surface of the housing, and arranged to sense an approach of the sensed member, and to sense a position of the shift lever.

6. The shift lever apparatus as claimed in claim 4,
wherein the shift lever base member includes a side hole connected with the another second opening end of the smaller diameter hole of the shift lever base member, a bottom portion defining the side hole, and a protruding portion extending from the bottom portion of the shift lever base member toward a bottom portion of the housing, and
wherein the shift lever apparatus further comprises a pressure sensor on the bottom portion of the shift lever base member within the side hole of the shift lever base member, and arranged to be pressed by the another second axial end of the smaller diameter portion of the shift lever movable member, and thereby to sense that the shift lever movable member is on the second axial side of an axial direction of the shift lever, a sensed member mounted on a side surface of the protruding portion of the shift lever base member, and detection sensors, respectively, at positions to correspond to the N-position, and the pair of positions, on an inner wall surface of the housing, and arranged to sense an approach of the sensed member, and thereby to sense a position of the shift lever movable member in the X-axis direction.

7. The shift lever apparatus as claimed in claim 1,
wherein the guide groove of the housing extends in the Z-axis direction, and receives the detent pin when the shift lever movable member is on the first axial side,
wherein the guide groove is arranged to restrict a pivot movement of the detent pin in the X-axis direction and in a Y-axis direction, and
wherein the detent pin is arranged to pivot about the shift shaft of the shift lever base member in the X-axis direction in accordance with the pivot movement of the shift lever when the shift lever movable member is on the second axial side.

8. The shift lever apparatus as claimed in claim 1,
wherein the shift lever movable member includes a mounting hole penetrating in the X-axis direction,
wherein the shift lever apparatus further comprises a stroke pin in the mounting hole of the shift lever movable member,
wherein the shift lever base member includes an elongated hole penetrating in the X-axis direction, and extending in the Z-axis direction from a first axial end to a second axial end,
wherein the stroke pin is inserted into the elongated hole of the shift lever base member, and
wherein the stroke pin is arranged to move from the first axial end of the elongated hole to the second axial end of the elongated hole when the shift lever movable member is moved from the first axial side to the second axial side, and to limit the movement of the shift lever movable member in the Z-axis direction relative to the shift lever base member.

\* \* \* \* \*